Jan. 27, 1959     H. ROSENBERG     2,870,837
HIGH SPEED PIVOTED CUTTING MACHINE
Filed April 17, 1957
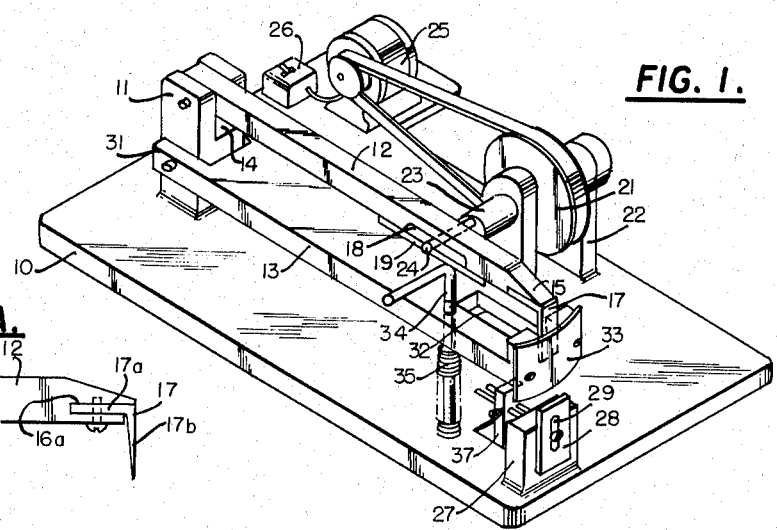
FIG. 1.
FIG. 2A.
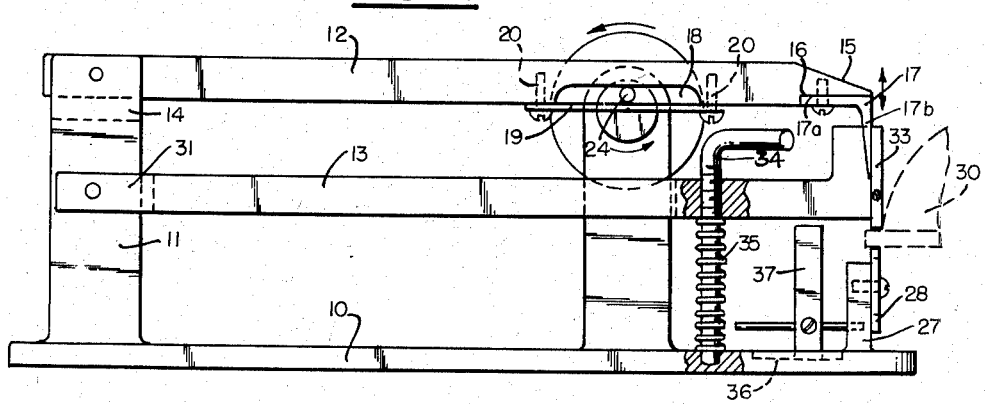
FIG. 2.
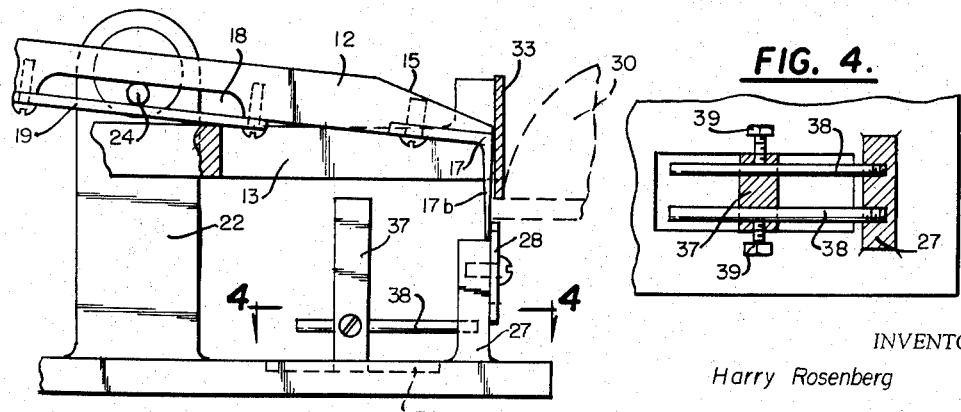
FIG. 3.
FIG. 4.
INVENTOR
Harry Rosenberg
BY Moore J Hall
ATTORNEYS

United States Patent Office 2,870,837
Patented Jan. 27, 1959

2,870,837

HIGH SPEED PIVOTED CUTTING MACHINE

Harry Rosenberg, Baltimore, Md.

Application April 17, 1957, Serial No. 653,468

7 Claims. (Cl. 164—43)

The present invention relates to motor energized cutters of the type which may be employed in various applications for cutting and trimming materials such as leather; and is more particularly concerned with an inexpensive and highly efficient cutting or trimming machine such as may be employed in shoe repairing and sole trimming applications.

It is often desired to provide a high speed cutter or trimmer adapted to be employed in the cutting of firm flexible materials such as leather, and such devices are particularly desired in shoe making and shoe repairing applications for the trimming of soles and the like. A number of cutting and trimming devices usable for such applications have been suggested in the past; but for the most part these devices are rather complex in structure and costly to manufacture and maintain, whereby devices of the types exemplified in the prior art have not found wide favor in small installations such as individual shoe repair shops, but have been confined for the most part to use in mass production operations such as large shoe factories.

By reason of the nature of the cutting and trimming machines utilized heretofore, therefore, a sole trimming operation in a shoe repairing shop has always been manual in nature and has contemplated that shoe repairmen employ a leather knife for the trimming of soles or other leather cutting operations. While the use of such a leather knife is accompanied by obvious disadvantages, including the slowness of the trimming operation and the attendant dangers of cutting or nicking the hands, nevertheless such a slow manual operation is still ordinary practice due primarily to the fact that individual shoe repairmen are unwilling to expend the sums necessary to purchase automatic machinery of the type employed in original shoe manufacture.

The present invention, recognizing this problem, is particularly directed toward providing a cutting or trimming machine which is inexpensive to manufacture and maintain; which may be used in a wide variety of applications other than sole trimming per se; and which exhibits extremely efficient operation while taking up little room. In short, the present invention is primarily directed toward providing an improved semi-automatic machine for the cutting or trimming of materials, which machine is more readily adaptable to small-scale trimming operations than the machines of the prior art.

It is accordingly an object of the present invention to provide an improved general purpose cutting and trimming machine.

A further object of the present invention resides in the provision of a cutting or trimming machine which is simple in construction, efficient in operation, and which can be installed and maintained in a small space.

Still another object of the present invention resides in the provision of a cutting or trimming machine readily adaptable to a wide variety of operations including sole cutting and trimming, strip cutting and the like.

Still another object of the present invention resides in the provision of a cutting or trimming machine so constructed that it is inherently safe in operation and includes improved guard means for protecting the operator during operation of the machine.

Still another object of the present invention resides in the provision of an improved knife arrangement for use in a cutting or trimming machine, which permits a cutting or trimming operation to be performed in a more restricted space than has been possible heretofore.

In providing for the foregoing objects and advantages, the present invention contemplates the provision of a cutting or trimming machine taking the form of an elongated arm pivotally connected at one end thereof to a fixed supporting structure and carrying a cutting knife at the other end thereof. The said other end of the arm is, in accordance with one particular feature of the present invention, tapered in configuration whereby it has a dimension substantially smaller than that of the pivoted end of the arm and the said tapered end of the arm in turn receives an L-shaped blade which does not appreciably increase the dimensions of the blade-supporting end of the arm. This particular portion of the invention, comprising a tapered arm end in association with an L-shaped blade, is another particular feature of the present invention in that the resulting construction permits a cutting blade to be firmly supported in position for cutting operations without taking up appreciable space which would restrict the utilization of the device.

The aforementioned arm and blade is further associated with a driving mechanism comprising a motor in combination with means adapted to convert the rotary motion of the motor into a reciprocating motion of the arm and blade about the pivot point of the arm. In accordance with still another feature of the present invention, this driving mechanism is coupled to the arm at a position intermediate its pivot and blade ends, and preferably at a position closely adjacent the blade end of the arm. By this arrangement, the knife-supporting arm can be made considerably shorter than has been the case heretofore; and as a result, the overall cutting and trimming apparatus can be made in relatively small sizes whereby it may be mounted and utilized in a small area thereby making the device more readily adaptable for use in small-scale operations. Moreover, in accordance with the present invention, it is extremely important that the knife-supporting arm be pivotally mounted at one end thereof, rather than at an intermediate position, since the pivotal end mounting assures that the blade end describes only a very small arc during its movement thereby assuring that the blade moves in a substantially straight line to give a straight cut. The pivotal end mounting, in addition, reduces wear on various parts of the mechanism as compared with other arrangements suggested in the past.

The aforementioned reciprocating arm and blade is further associated with a guard and guide structure of improved configuration; and this latter structure performs dual functions, in that it may be selectively moved in a given direction thereby to receive various thicknesses of material to be cut, and at the same time prevents an operator's hands or fingers from coming into contact with the reciprocating blade. These functions are accompanied by a further function, i. e. the guide and guard structure guides the blade during its reciprocation thereby preventing movement of the blade in a direction transverse to its direction of reciprocation.

In accordance with still another feature of the present invention, the improved structure described previously may be associated with further guide means preferably taking the form of a selectively movable block disposed adjacent the reciprocating blade; and as will be described subsequently, this block permits the device to be used in strip cutting applications thereby substantially increasing the value and modes of utilization of the machine in small-scale operations.

The foregoing objects, advantages, construction and operation of the present invention will become more readily apparent from the following description and accompanying drawing, in which:

Figure 1 is a perspective view of an improved cutting and trimming machine constructed in accordance with the present invention.

Figure 2 is a side view of the machine shown in Figure 1, illustrating the interrelationship of the several parts.

Figure 2A is a partial cross-sectional view of an alternative blade-mounting arrangement in accordance with the present invention.

Figure 3 is a partial cross-sectional view of the machine shown in Figures 1 and 2 and illustrates the functioning of the machine during a cutting operation; and Figure 4 is a view taken on line 4—4 of Figure 3, illustrating the improved guide block of the present invention.

Referring now to Figure 1, it will be seen that, in accordance with the present invention, an improved semi-automatic cutting or trimming machine may comprise a housing (not shown) enclosing a substantially flat plate 10 having an upstanding support structure 11 thereon. A pair of elongated arms 12 and 13 are each pivotally coupled to the support structure 11 at one of their ends respectively, within said housing, and the said arms 12 and 13 extend in the same direction from support structure 11 in generally parallel superposed relation to one another. It will be understood, of course, that this parallel relationship is not a fixed relationship, but will vary with adjustments and movements of the arms, such as will be described. Arm 12 comprises an elongated bar which is inserted in a recess 14 within support structure 11, and the said bar 12 is of generally uniform cross-section. The non-pivoted end of the arm or bar 12 is, however, tapered as at 15, whereby the thickness of the arm at its non-pivoted end is substantially less than that at its pivoted end.

Bar 12 defines an elongated groove 16 on its under surface adjacent the taper 15, and an L-shaped blade 17 is inserted into the said recess 16, as illustrated in Figures 1, 2 and 3. In particular, blade 17 includes a first leg 17a extending in the direction of elongation of bar 12 and adapted to receive a bolt or screw; and the said L-shaped blade 17 includes a further leg 17b extending transverse to the direction of elongation of bar 12 and having a cutting edge at its lowermost surface.

The provision of groove 16 on the under surface of bar 12 is not mandatory and various modifications will be suggested to those skilled in the art. In particular, as illustrated in Figure 2A, the groove may be disposed internally of the bar 12, this having been designated by the numeral 16a, and the blade 17, having the aforementioned portions 17a and 17b, may thereafter be inserted into and retained within the groove 16a, as illustrated in Figure 2A. The portion 17b of blade 17 is preferably substantially straight or flat in configuration, as opposed to arcuate blades suggested heretofore, and this provision of a flat blade in combination with the straight up and down movement of that blade, to be described, results in straighter cuts than has been possible heretofore.

Arm 12 also includes an elongated slot or groove 18 disposed intermediate the pivoted and non-pivoted ends of bar 12, and preferably disposed closely adjacent to the tapered end 15 of arm 12. A bearing block 19 is removably and replaceably attached to arm 12 by screws 20, whereby groove 18 and block 19 define an elongated enclosed slot such as is particularly illustrated in Figures 2 and 3.

A driving mechanism is provided, and this driving mechanism comprises a pulley 21 mounted for rotation on a further supporting structure 22, and having a shaft 23 carrying an off-center pin 24 which is inserted in the enclosed groove defined by bearing block 19. Pulley 21 is belt-coupled to a motor 25 which is in turn controlled by a switch 26 whereby, upon energization of motor 25, the pulley 21 rotates; and this rotation of pulley 21 causes an eccentric movement of pin 24 in the groove defined between block 19 and slot 18 on bar 12, thereby to convert the rotary motion of motor 25 and pulley 21 into a reciprocating motion of arm 12 and knife 17.

It will be noted that this reciprocating motion of arm 12 and knife 17 is accomplished by a drive mechanism coupled to the bar 12 at a position closely adjacent to the knife, thereby avoiding possible vibration of the knife, and attendant wear, during movement of said knife. Moreover, since bar 12 is pivoted at one end thereof, rather than at an intermediate position, the knife 17 is moved in a reciprocating motion in a substantially straight up and down direction, with considerable force, and this substantially straight movement of the knife 17 is further accomplished with a shorter overall length of bar 12 than would be necessary if the drive were coupled to the bar at some other portion of the bar. The actual movement of the knife 17 will be readily seen by comparison of Figures 2 and 3 which show the positions of knife 17, and particularly of the cutting leg 17b thereof, for extreme positions of the reciprocation.

A further support structure 27 is provided on plate 10 closely adjacent to the path of reciprocation of blade 17, and this further support structure carries a shearing blade 28 having an elongated slot 29 therein whereby the position of the shearing blade may be selectively adjusted upward or downward relative to the path of reciprocation of blade 17. Shearing blade 28 cooperates with blade portion 17b of blade 17 during the reciprocation of the latter, to shear articles being trimmed or cut; and a sole trimming application, such as may be required in shoe repair techniques, contemplates the interposition of the sole of a shoe 30 between shearing blade 28 and reciprocating blade 17, whereby the said sole is trimmed and shaped during reciprocation of the blade.

For such a sole trimming application, it will be noted that the sole is trimmed from the upper toward the lower faces of the sole, and the provision of the tapered portion 15 and L-shaped blade 17 permits this operation to be accomplished more efficiently than has been the case heretofore. In particular, it will be observed that in trimming that portion of a sole adjacent the shoe instep, the body of the shoe itself tends to interfere with insertion of a reciprocating blade; and the utilization of the tapered end 15 and L-shaped blade 17 obviates this difficulty present in structures used heretofore, thereby permitting an accurate trimming operation to occur in this restricted portion of the shoe as well as in other portions.

The arm 13, mentioned previously, accomplishes a plurality of functions; and in particular, this arm acts to guide blade 17 during its reciprocation; acts further as a welt protector and guide during a sole trimming or cutting operation; and in addition, acts to support an improved guard which prevents injury to an operator. Arm 13 is bifurcated at each of its ends, and one of these bifurcated ends 31 is pivoted to the aforementioned support structure 11. The other end of the arm 13 defines an elongated slot 32, the cross dimension of which is very slightly larger than the width of blade 17 whereby portion 17b of the said blade 17 tends to reciprocate within slot 32 of arm 13. It will be noted that due to this choice of dimensions for slot 32, the blade 17 is confined in its movement to the reciprocal motion mentioned previously, and cannot move or wobble appreciably in a direction transverse to this direction of reciprocation, whereby the cutting function of the blade is enhanced and made much cleaner than has been possible heretofore.

The unpivoted end of arm 13 carries a curved shield 33 disposed adjacent the outer surface of blade portion 17b; and the height of the shield 33 is so chosen that it covers substantially all of blade portion 17b during the reciprocation of this blade portion. By reason of guard or shield 33, therefore, the reciprocating blade 17 is isolated from the hand or fingers of an operator holding a shoe, such as 30, thereby preventing injury to the operator. Shield 33 also performs another function, in that when the overall apparatus is utilized for sole trimming or cutting, the outer surface of the said shield or guard 33 bears upon the shoe welt thereby to provide a guide for the sole trimming or cutting operation.

In addition, a handled shaft 34 is threaded through a portion of bar 13 into engagement with plate 10, and a compression spring 35 is interposed between the lower surface of arm 13 and the upper surface of plate 10 whereby arm 13 may be selectively pivoted about its pivot point on support structure 11 by the turning of shaft 34. By appropriately positioning bar 13, therefore, the shield or guard 33 may be moved to any desired position relative to shearing blade 28, thereby to provide a gap of appropriate width adapted to receive any thickness of material to be cut; and during this movement of arm 13 and guard 33, the guard still serves to cover reciprocating blade 17; and in addition, slot 32 in arm 13 still performs its guiding function on the movement of blade 17.

As mentioned previously, the structure of the present invention is adapted to perform cutting and trimming functions other than those related to sole trimming or cutting per se. In particular, it is often desired to cut strips of leather or the like, and the device of the present invention is capable of performing this operation, thereby increasing the utility and value of the device to small-scale manufacturing or repairing operations. In accomplishing this latter purpose, the plate 10 is provided with a recess 36 adapted to receive a block 37 for slidable movement; and the block 37 in turn slidably receives a pair of shafts 38 which are fixedly attached at one end thereof to support structure 27 (see Figure 4 in particular). The shafts 38 pass through complementary bores in block 37 and cooperate with set screws 39 whereby the block 37 may be slidably adjusted in groove 36 toward and away from the path of reciprocation of blade portion 17b; and may thereafter be fixed at any desired position by tightening of set screws 39 into contact with fixed rods 38.

Block 37 acts as a guide during the aforementioned strip cutting applications; and in particular, when it is desired to cut an elongated strip of material, for instance from a piece of leather, the said piece of leather may be inserted between guard 33 and shearing blade 28 into contact with block 37 whereafter the arm 12 may be caused to reciprocate by energization of motor 25, and the piece of leather may be moved in a linear direction along guide block 37 to provide a substantially straight cut in the said piece of leather. The actual position of block 37 shown in the accompanying drawings is illustrative only, and said block may in fact be positioned rearward of the groove 18 rather than forward thereof, as actually illustrated.

While I have thus described a preferred embodiment of the present invention, many variations will be suggested to those skilled in the art. It must therefore be stressed that the foregoing description is meant to be illustrative only and should not be considered limitative of my invention. All such variations and modifications as are in accord with the principles described are meant to fall within the scope of the appended claims.

Having thus described my invention, I claim:

1. In a cutting apparatus, a supporting structure, a first elongated arm having one end thereof pivotally supported on said supporting structure, the other end of said first arm being tapered in configuration thereby to exhibit a thickness substantially less than that of said one end of said arm, an L-shaped blade supported by said first arm adjacent the said tapered other end thereof, said L-shaped blade having a first leg extending in the direction of elongation of said elongated arm closely adjacent to the thinner end of said arm, said L-shaped blade having a second leg extending transverse to said first leg and having a cutting edge spaced from said first leg, driving means coupled to said first arm between the ends thereof at a position closer to said thinner other end than to said thicker one end of said arm, said driving means including means for reciprocating said first arm and said L-shaped blade about its pivot point between first and second positions, a shearing blade closely adjacent one of said reciprocating positions of said L-shaped blade, a guard and guiding structure mounted adjacent said reciprocating blade, said guard and guiding structure comprising a second elongated arm having one end thereof pivotally supported on said supporting structure adjacent the pivot point of said first mentioned elongated arm, said first and second elongated arms extending in the same direction from said supporting structure, said second elongated arm including a pair of elongated substantially parallel guides adjacent the other end thereof respectively disposed closely adjacent opposite elongated edges of said second leg of said L-shaped blade whereby said blade is restricted from moving appreciably in directions transverse to its reciprocating motion by said parallel guides, a guard structure attached to the free ends of said parallel guides whereby said second leg of said L-shaped blade moves reciprocally in a space defined respectively between said guides, said guard, said shearing blade, and said first leg of said L-shaped blade, and means for prepositioning said second elongated arm and the guide carried thereby at varying positions relative to said shearing blade, whereby an article to be cut may be inserted between said guide and shearing blade in the path of reciprocation of said L-shaped blade.

2. The structure of claim 1 wherein said guard is disposed adjacent one face of said second leg of said L-shaped blade, and a guide block movably mounted adjacent the other face of said second leg of said L-shaped blade for positioning an article to be cut between said reciprocating and shearing blades.

3. The combination of claim 1 wherein said first elongated arm includes an elongated groove on one edge thereof adjacent said thinner end thereof, an elongated bearing block removably mounted on said first arm adjacent said groove whereby said bearing block and groove define an elongated slot disposed adjacent said thinner end of said elongated arm, said driving means comprising a rotary element having an eccentrically disposed pin extending into said elongated slot, and motor means for rotating said rotary element.

4. The combination of claim 1 wherein said first elongated arm includes an elongated slot extending from the thinner end of said arm in the direction of elongation of said arm, said first leg of said L-shaped blade being removably disposed in said elongated slot.

5. In a cutting apparatus, a supporting structure having first and second elongated arms pivotally mounted thereon, said first and second elongated arms each being pivotally mounted at one end thereof and extending in the same direction from said supporting structure one above the other, the upper one of said arms having a blade removably affixed to the other end thereof, said blade extending downwardly from said upper arm toward said lower arm, said lower arm including an elongated slot therein for receiving and guiding said downwardly extending blade, means for fixing said lower arm at a preselected one of plural possible positions relative to said supporting structure, driving means coupled to said upper arm at a position adjacent said blade and removed from the pivot end of said upper arm, said driving means including a motor and means for converting the rotary motion of said motor into a reciprocating motion of said upper arm about its pivot end, whereby said blade is caused to reciprocate through said elongated slot in said lower arm, and a shield structure carried by the other non-pivoted end of said lower arm adjacent said reciprocating blade, said shield structure being of sufficient size substantially to cover said blade during the reciprocations thereof.

6. The combination of claim 5 including a shearing blade adjacent one extreme position of said reciprocating blade, and means for adjusting the position of said shearing blade toward and away from said elongated arms.

7. The combination of claim 5 wherein said blade is L-shaped in configuration, one leg of said L-shaped blade being removably attached to said upper arm, the other leg of said L-shaped blade extending toward said lower arm in a direction transverse to the direction of elongation of said upper arm.

References Cited in the file of this patent
UNITED STATES PATENTS

| | | |
|---|---|---|
| 1,767,763 | Johnson | June 24, 1930 |
| 1,842,229 | Achard | Jan. 19, 1932 |
| 2,130,473 | Ruau | Sept. 20, 1938 |
| 2,229,917 | Cunningham | Jan. 28, 1941 |
| 2,333,293 | Cartlidge | Nov. 2, 1943 |